Figure 1:
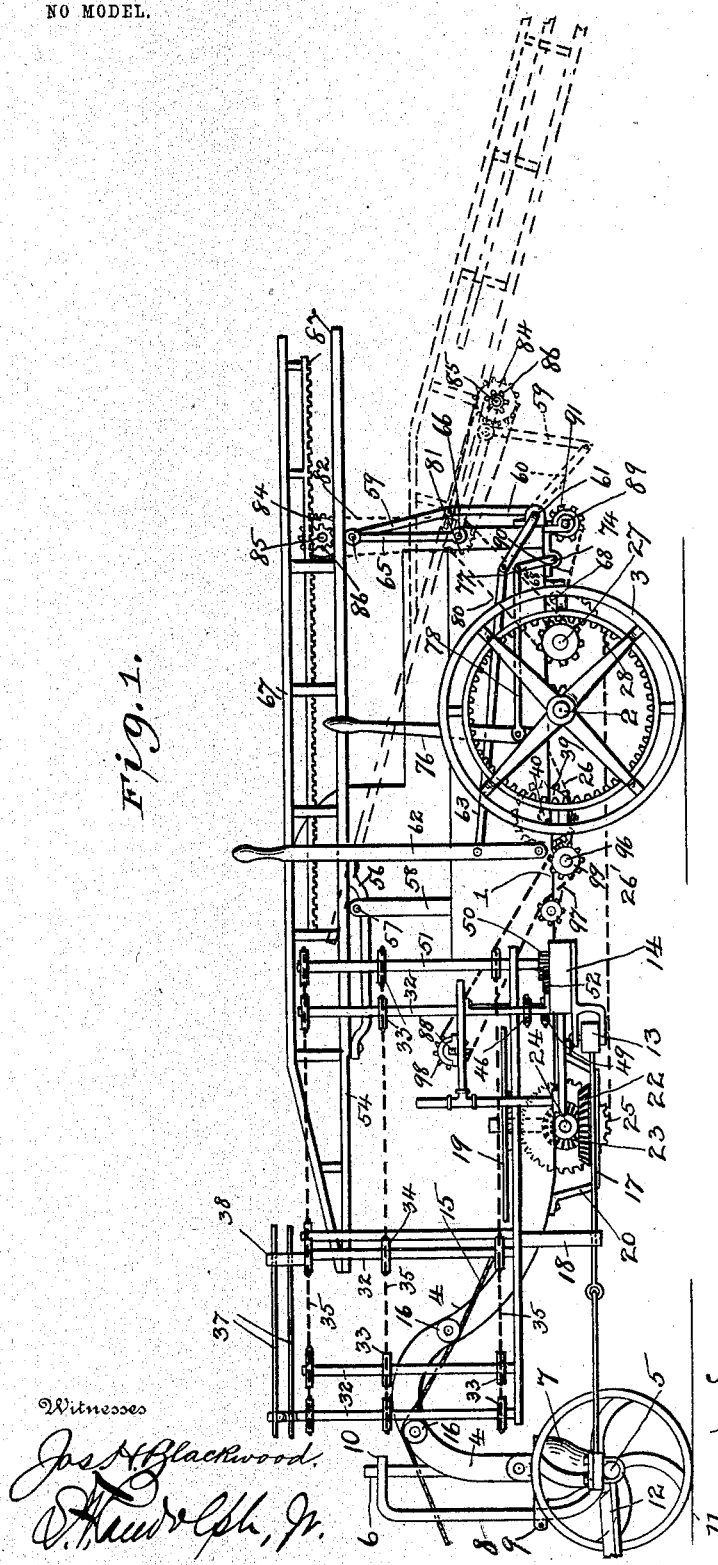

No. 732,816. PATENTED JULY 7, 1903.
N. BADER.
CORN HARVESTER.
APPLICATION FILED SEPT. 2, 1902.
NO MODEL. 6 SHEETS—SHEET 1.

Witnesses
Jos H Blackwood.
S. Randolph, Jr.

Inventor
Nicholas Bader
by D. A. Gourick
his Attorney

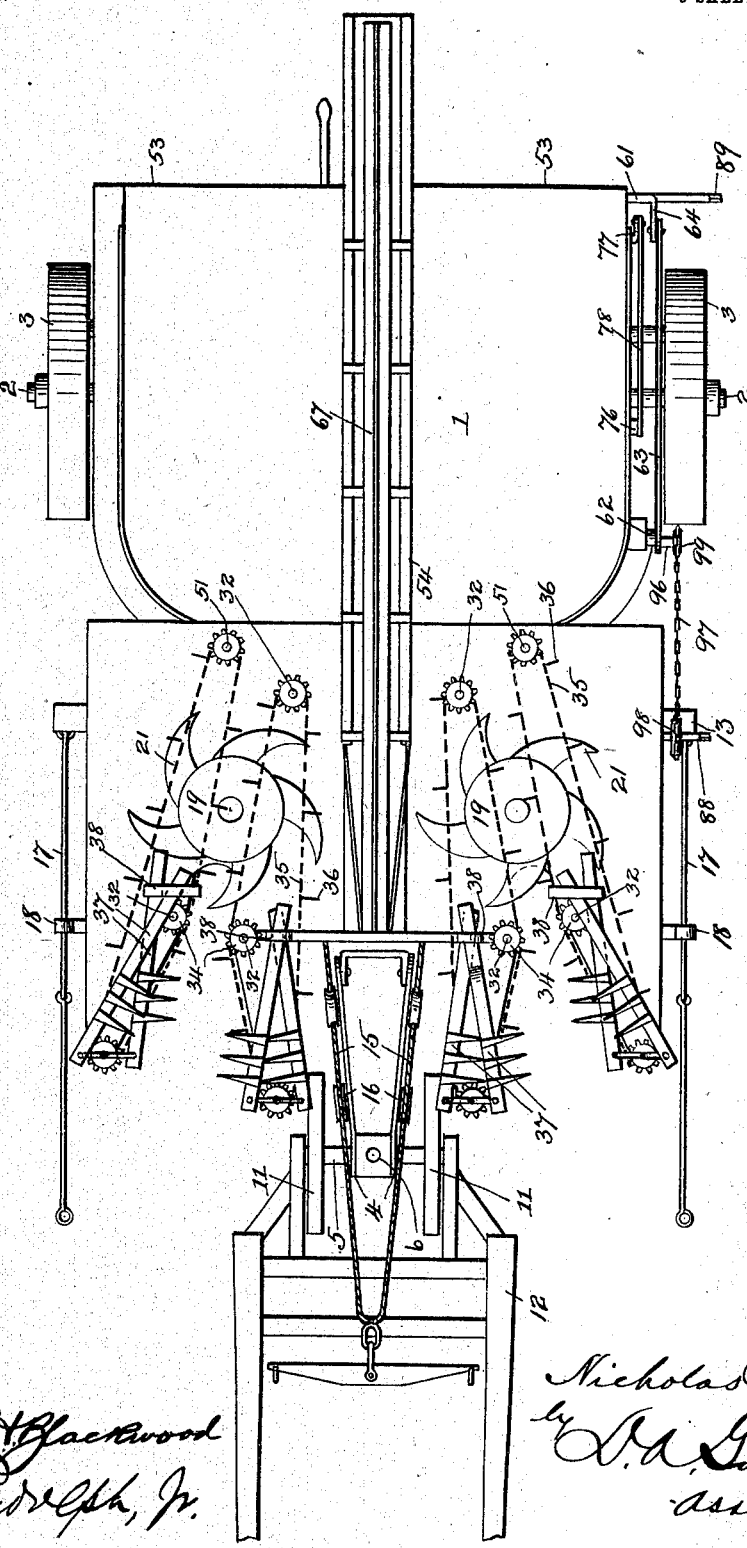

No. 732,816. PATENTED JULY 7, 1903.
N. BADER.
CORN HARVESTER.
APPLICATION FILED SEPT. 2, 1902.
NO MODEL. 6 SHEETS—SHEET 3.
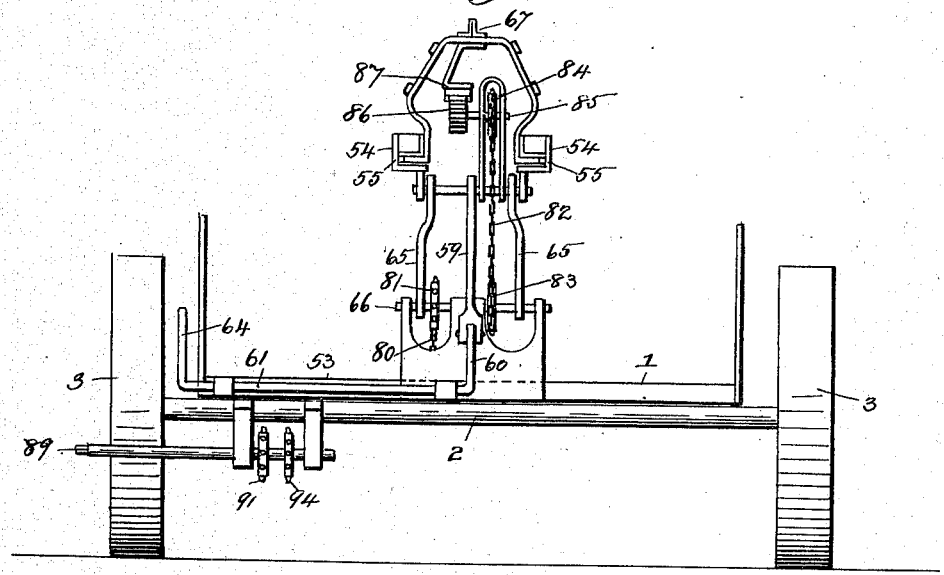
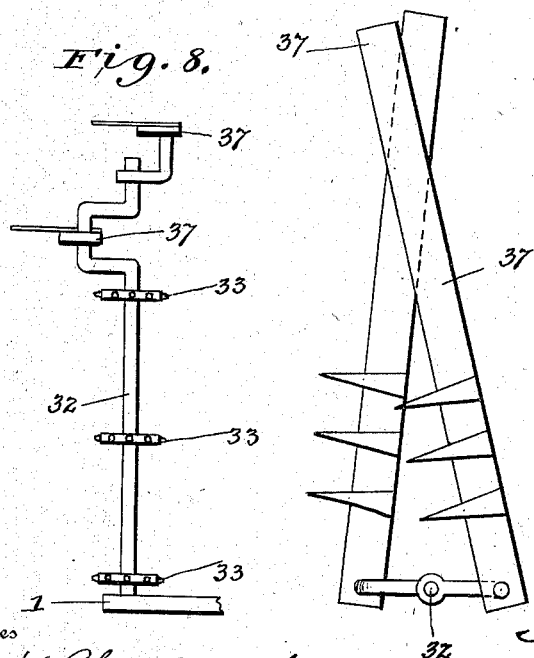
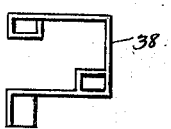

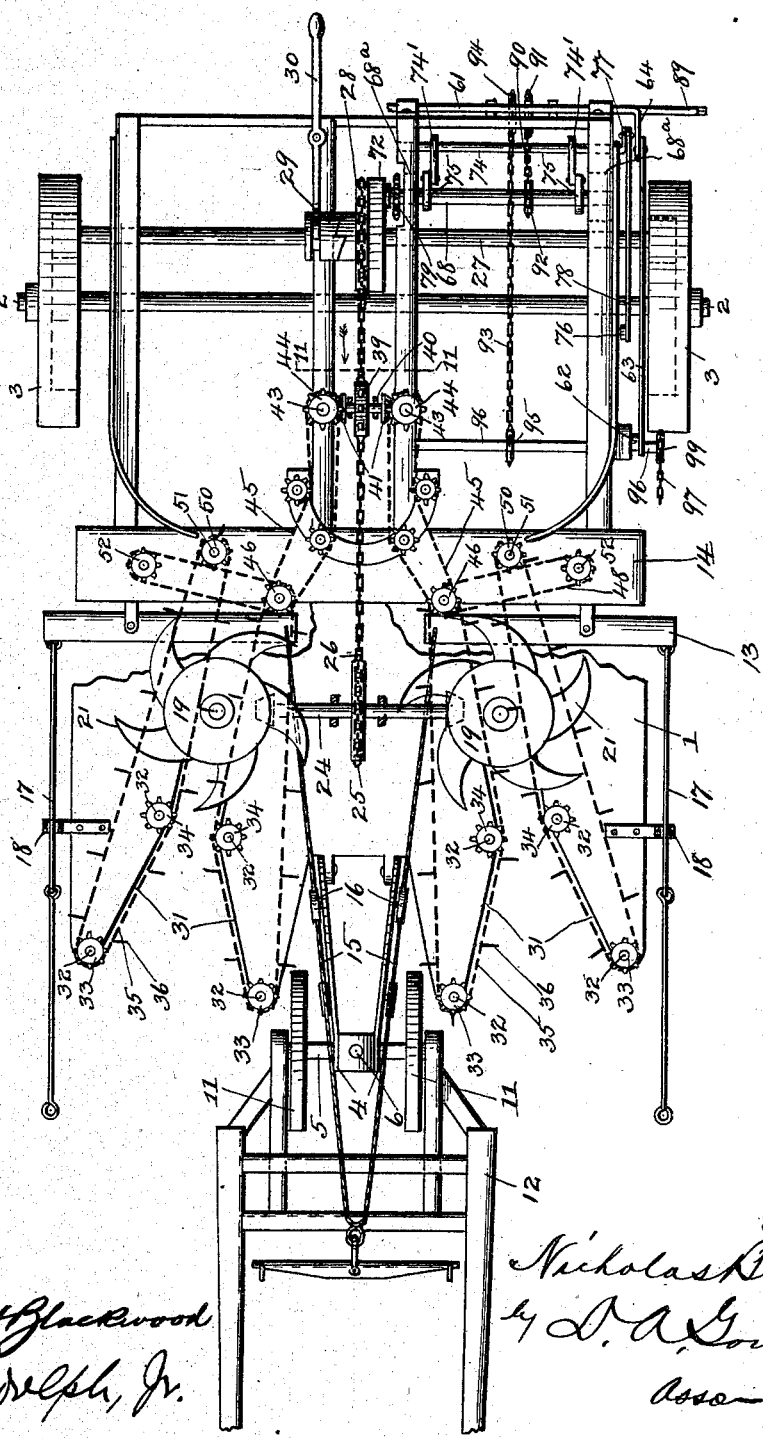

No. 732,816. PATENTED JULY 7, 1903.
N. BADER.
CORN HARVESTER.
APPLICATION FILED SEPT. 2, 1902.
NO MODEL. 6 SHEETS—SHEET 5.
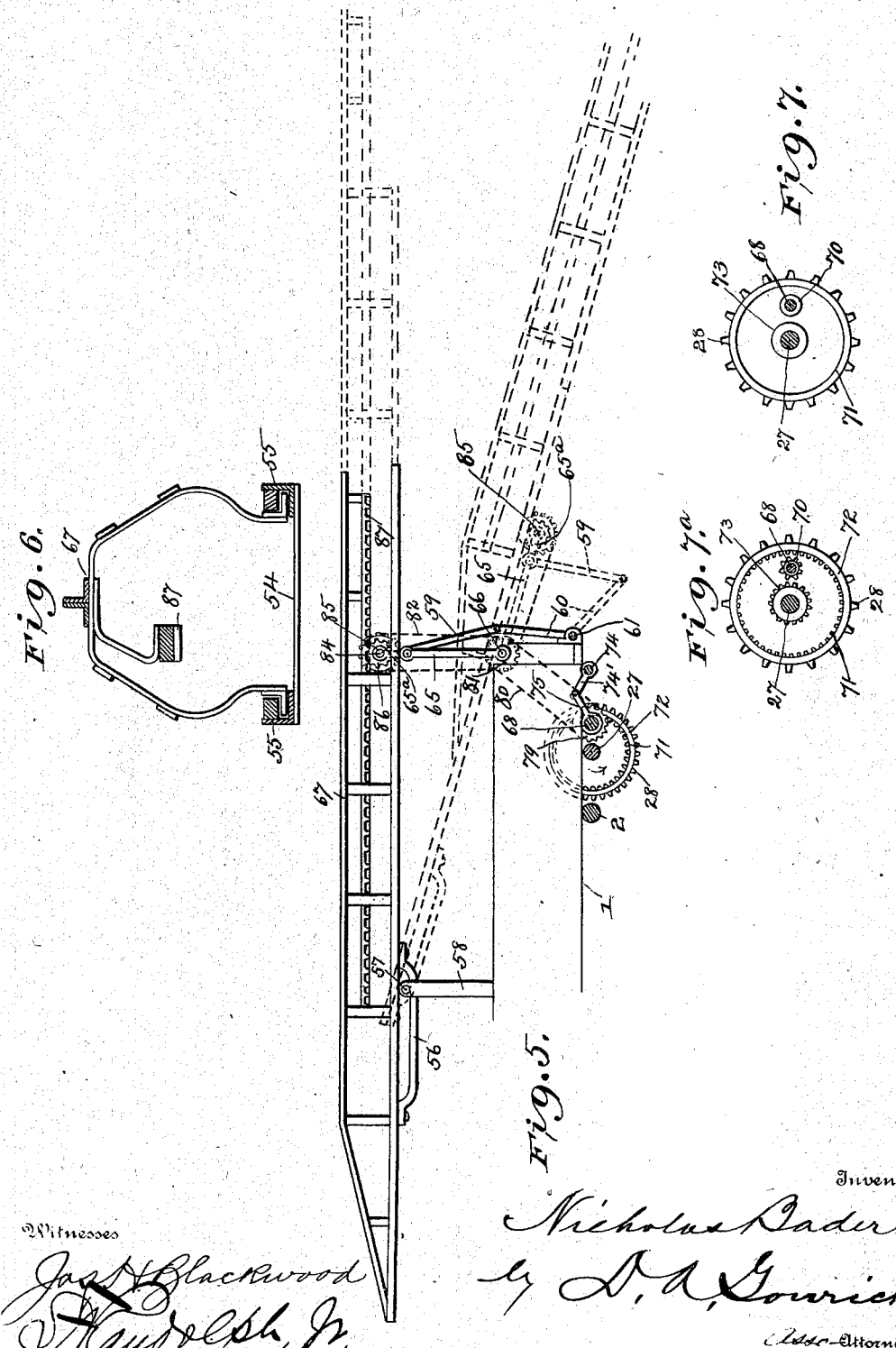
Witnesses
Jas. H. Blackwood
S. Randolph, Jr.
Inventor
Nicholas Bader
by D. A. Gowrick
Asso. Attorney
THE NORRIS PETERS CO., PHOTO-LITHO., WASHINGTON, D. C.

No. 732,816. PATENTED JULY 7, 1903.
N. BADER.
CORN HARVESTER.
APPLICATION FILED SEPT. 2, 1902.
NO MODEL. 6 SHEETS—SHEET 6.
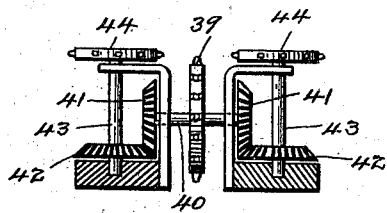
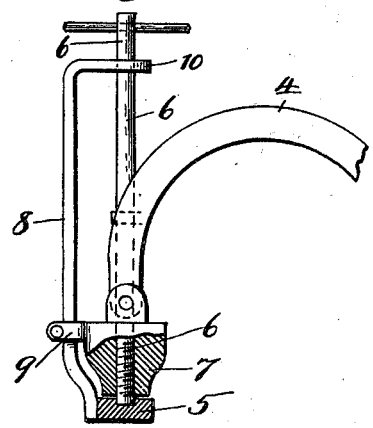
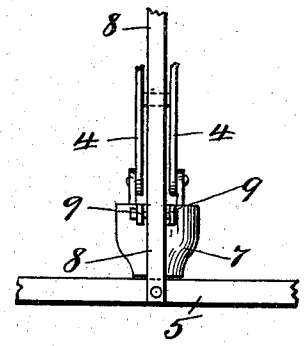
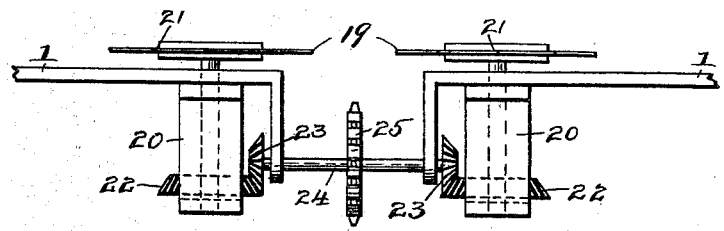
Witnesses
Jos. H. Blackwood
D. H. Randolph, Jr.
Inventor
Nicholas Bader
by D. A. Gourieff
Asso — Attorney No. 732,816. Patented July 7, 1903.

UNITED STATES PATENT OFFICE.

NICHOLAS BADER, OF MARION, OHIO.

CORN-HARVESTER.

SPECIFICATION forming part of Letters Patent No. 732,816, dated July 7, 1903.

Application filed September 2, 1902. Serial No. 121,879. (No model.)

*To all whom it may concern:*

Be it known that I, NICHOLAS BADER, a citizen of the United States, residing at Marion, in the county of Marion and State of Ohio, have invented certain new and useful Improvements in Corn-Harvesters, of which the following is a specification.

My invention relates to machines for harvesting corn, and has for its objects to provide a machine that cuts the stalks and conveys them in an upright position to a platform at the rear of the machine, where they are gathered together in a shock and bound; also, the provision of a shock-deliverer so constructed that the shock is carried to the rear of the machine, lowered to the ground, and left standing in an upright position behind the machine.

Additional advantages of my invention will more fully appear hereinafter and by reference to the accompanying drawings, in which—

Figure 1 is a side view in elevation of my invention; Fig. 2, a top plan view; Fig. 3, a rear view; Fig. 4, a plan view with the upper structure removed, showing the operating mechanism, certain parts being in section; Fig. 5, a detached view of the shock former and conveyer and operating means; Fig. 6, an enlarged cross-section of the shocker; Fig. 7, a detail view of the main sprocket-wheel and connections; Fig. 7ª, a modification of construction shown in Fig. 7; Fig. 8, a view of one of the front vertical shafts of the stalk-conveyer; Fig. 9, a plan view of a pair of reciprocating bars carrying the kicking-fingers; Fig. 10, a view of one of the brackets for holding a pair of reciprocating bars; Fig. 11, an enlarged view on line 11 11 of Fig. 4 looking in direction of the arrow; Figs. 12, 13, and 14, detail views of the lifting-jack for regulating the height of the front of the machine, and Fig. 15 a detail view of the gearing for operating the cutting-disks.

Referring to the drawings, in which similar reference characters indicate corresponding parts throughout the several views, 1 represents the body of my machine, mounted on an axle 2, on which are journaled the drive-wheels 3 and by means of the gooseneck 4 a front axle 5, said axle having revolubly secured thereto a screw-shaft 6, which operates in a screw-threaded bore in the collar 7, pivotally mounted on the end of gooseneck 4, 8 being a stay-rod secured to shaft 5, passing between ears 9 on the collar 7 and having its upper end bent at right angles and formed with a perforated extremity 10 to receive the upper end of screw-shaft 6. It will be readily understood from this construction that the height of the front of the platform 1 may be adjusted by turning the screw-shaft 6 in the direction desired, the purpose being to adjust the machine to the distance from the ground at which it is desired to sever the stalks of corn. The axle 5 is made short, so that it may pass between two rows of corn, my machine being designed to cut two rows at one time, and has the wheels 11 journaled thereon and the thills 12, of any approved construction, secured thereon.

In order that my machine may be drawn by three draft-animals walking abreast, I provide a pivoted swingletree 13 on each end of the beam 14, connecting the inside ends of said swingletrees with the animal between the shafts by means of cables 15, which run over pulleys 16 on gooseneck 4 and are joined at their front ends to receive a whiffletree.

17 represents rods attached to the outer end of each swingletree 13 and, passing forward through the slotted bracket 18 on each side of the machine, have their front ends formed to receive whiffletrees, to which are attached draft-animals on each side of the animal hitched between the shafts 12. It will be readily understood that by this construction as the beam 14 is behind the cutting apparatus the draft attachments will not interfere with the standing corn, and at the same time the animals move between different rows, the outer animal, however, having a row on one side only. It will also be understood that the animal hitched between the shafts controls the direction of the machine, as the other animals are in no way connected with the steering mechanism.

The cutting apparatus consists of a rotary disk 19, suitably journaled, by means of brackets 20, to each side of the machine, and has a plurality of hook-shaped blades 21 either integral therewith or secured thereon. Keyed to each shaft on which the cutting-disks are secured is a beveled gear-wheel 22, and meshing therewith are beveled pinions 23, keyed to shaft 24, which is suitably journaled under the platform 1.

25 is a sprocket-wheel also keyed to shaft 24, and 26 a chain for transmitting power from the shaft 27, journaled at the rear of the machine and having gear-pinions keyed at each end, which mesh with annular racks on drive-wheels 3. The sprocket-wheel 28 is journaled on the shaft 27 and is thrown in and out of gear by means of clutch 29, controlled by lever 30.

On each side of the machine are secured upright frames 31, and 32 represents vertical shafts journaled therein, on which are keyed sprocket-wheels 33 or idlers 34 to receive chains 35, which have secured thereto projecting fingers 36 to gather and pull the standing corn to the cutting-disks and afterward convey the severed stalks to the rear, where they are gathered into a shock, as will be more fully described. The frames 31 are made flaring at front, so as to insure gathering all the stalks, but at the rear are closer together to insure carrying them to the shockers. The top shafts 32 are cranked and have journaled thereon one end of rods 37, the other ends of said rods being mounted in brackets 38, secured to the framework. Each rod 37 has a number of spikes secured thereto. These rods and spikes constitute what I call "kickers," their purpose being to give an intermittent striking motion to the top part of the standing corn to assist in pushing it toward the cutting-disks.

Power is applied to the gatherers and conveyers just described through a sprocket-wheel 39, keyed to a shaft 40, suitably journaled over the chain 26 and meshing therewith.

41 represents beveled gears keyed to the shaft 40, which mesh with beveled gears 42, keyed to short vertical shafts 43, on which are keyed sprocket-wheels 44.

45 represents chains geared to sprocket-wheels 44 and to sprocket-wheels 46, keyed to the rear shaft 32 in the frame 31 toward the center of the machine.

48 represents chains geared to sprocket-wheel 49, keyed to shaft 32, which pass over sprocket-wheels 50, keyed to the rear shafts 51 of the frame 31 toward the sides of the machine and around idlers 52.

After the stalk has been severed it is carried to the rear, where it is received by a laborer stationed on a platform 53 on each side of the machine and thrown against a shocker, which consists of a frame 54, made up of two grooved rails 55, suitably braced, mounted, by means of slotted brackets 56, to a cross-rod 57, supported by uprights 58 in the center of the machine and by a crank-arm 59 at the rear of the machine, connected with a crank 60 on the shaft 61, journaled at the rear of the machine, and operated by a lever 62, connected, by means of reach-rod 63, with the arm 64 on said shaft 61. A frame-support 65 is pivotally mounted on shaft 66 at the rear of the machine and pivotally connected with the bottom of frame 54.

67 represents a framework slidably mounted in the grooves in rails 55 and is the part upon which the shock is formed.

The frame 67 is slid in the grooves in rails 55 by means of power communicated from shaft 68, journaled in slidable boxes 68ª and having a pulley 70, keyed at its end and adapted to intermittently mesh with an inner face 71 of an offset 72 to sprocket-wheel 28 or with face 73 of the hub of said sprocket-wheel. It will be readily understood that the direction of rotation of shaft 68 may be determined by causing pulley 70 to press against either 71 or 73. In order to slide shaft 68 so that pulley 70 bears against the desired face, I provide a rock-shaft 74, having a crank 74', connected, by means of an arm 75, with the shaft 68, said shaft 74 being oscillated by a lever 76, connected with a crank 77 on the end of shaft 74 by means of reach-rod 78. It will readily appear that cog-gearing, as shown in Fig. 7ª, may be substituted for the frictional gearing above described.

A sprocket-wheel 79 is keyed to shaft 68, and a chain 80 is geared around said wheel 79 and sprocket-wheel 81, keyed to shaft 66. 82 represents another chain geared to sprocket-wheel 83, also keyed to shaft 66, and to sprocket-wheel 84, keyed to a shaft 85, journaled in the upper end 65ª of frame-support 65.

86 represents a spur-gear keyed to shaft 85 and meshing with a gear-rack 87, secured to framework 67.

It will be understood from this description that after the shock has been formed against the framework 67 and tied above the framework by the laborers stationed on platform 53 the lever 76 is thrown forward by one of said laborers to cause pinion 70 to mesh with gear-face 73 on the hub of sprocket-wheel 26, which will cause the framework 67 to slide to the rear by means of spur-gear 86 operating in the gear-rack 87. As soon as the shock has been carried clear of the rear end of the machine the lever 62 is pulled back, which by means of crank 60 causes the rear end of frame 54 to dump, thus lowering the shock to the ground and permitting the shocker-frame to slide clear thereof. As shaft 85 is journaled in frame-support 65 above the point at which said support is pivoted to frame 54, it will readily appear that when said frame is thrown down the spur-gear 86 is thrown out of mesh with gear-rack 87, so that it does not operate. After the shocker has got clear of the shock lever 62 is thrown forward, raising frame 54 up to a horizontal position, bringing spur-gear 86 and rack 87 again into mesh. The lever 76 is then thrown back, causing the shaft 68 to move, so that pinion 70 meshes with gear-face 71. The motion thus imparted to shaft 68 and its gear connections will cause the framework 67 to resume its normal position, after which the lever 76 is thrown partly forward, so as to cause the pinion 70 to be out of mesh with both gear-faces 71 and 73, in which position it remains while the shock is being formed. The same operation is repeated each time the shock has been formed and is dumped.

If it is desired to move the shocker while the machine is at a standstill, I have provided two shafts 88 and 89, fitted with squared ends to receive the socket of any suitable crank-handle, the shaft 89 being connected to shaft 68 by means of chain 90, geared to sprocket-wheel 91 on shaft 89 and 92 on shaft 68. A chain 93 is also geared to another sprocket-wheel 94 on shaft 89 and to sprocket-wheel 95 on counter-shaft 96.

97 represents a chain connecting sprocket-wheel 98 on shaft 88 with sprocket-wheel 99 on counter-shaft 96.

Having thus described my invention, what I claim is—

1. In a corn-harvester, a shocker consisting of a grooved frame, said grooved frame being slidably and pivotally mounted at the front end and vertically moving at its rear end, a frame slidably mounted in said grooved frame, and means to actuate said frames, substantially as shown and described.

2. In a corn-harvester, a rock-shaft suitably journaled, a shocker consisting of a frame having longitudinal grooves therein, the rear of said frame connected with said rock-shaft and adapted to reciprocate vertically, a frame slidably mounted in said grooved frame, and means to actuate said rock-shaft and slidable frame, substantially as shown and described.

3. In a corn-harvester, a longitudinally-grooved frame mounted at its front end by means of brackets, and near its rear by a pivoted upright, a crank-arm secured to said grooved frame, and a frame slidably mounted in said grooved frame, substantially as shown and described.

4. In a corn-harvester, a shocker consisting of a frame having longitudinal grooves therein, the front of said grooved frame pivotally mounted and its rear adapted to reciprocate vertically, a frame slidably mounted in said grooved frame, and connections between said slidable frame and the carrying-wheels of the harvester to cause said slidable frame to operate, substantially as shown and described.

5. In a corn-harvester, a longitudinally-grooved frame, said frame being mounted to reciprocate vertically at its rear, a frame slidably mounted in said grooved frame, a rack-bar on said slidable frame, a gear-pinion meshing with said rack-bar, and suitable gearing connected with the carrying-wheels of the harvester to actuate said gear-pinion, substantially as shown and described.

6. In a corn-harvester, a frame mounted thereon by means of brackets and a horizontal rod, grooved rods at the sides of said frame, a frame slidably mounted in said grooved rods, a rack-bar secured to said frame, a pivoted upright at the rear of the machine, a gear-pinion journaled therein meshing with said rack-bar, a sprocket-wheel on the shaft carrying said gear-pinion, a shaft journaled in the base of the machine, gear connections between said shaft and sprocket-wheel, and means to cause said shaft to rotate in either direction, substantially as shown and described.

7. In a corn-harvester, a driving-shaft suitably mounted and geared to the wheels of the machine, the driving-wheel loosely journaled on said shaft, a suitable clutch for keying the driving-wheel to the shaft, said driving-wheel being formed with a sprocket-face, an interior gear and a gear on the hub, a shaft journaled parallel with the driving-shaft in sliding boxes, a gear-pinion keyed to said shaft and adapted to mesh with the gear-face on the interior of the drive-wheel or on the hub intermittently, a shaft journaled at the rear of the machine, a sprocket-chain connecting said shaft and the slidably-journaled shaft, an upright pivoted on said shaft having a shaft journaled at its end, a chain connecting said shafts, a gear-pinion keyed to the shaft journaled in the upright, a grooved frame pivotally mounted on said upright, a frame slidably mounted in said frame, and a rack-bar secured to said slidable frame and meshing with said gear-pinion, substantially as shown and described.

In testimony whereof I hereto affix my signature in the presence of two witnesses.

NICHOLAS BADER.

Witnesses:
GRANT E. MAUSER,
GEO. MCGRATH.